United States Patent [19]
Clapp et al.

[11] Patent Number: 5,374,971
[45] Date of Patent: Dec. 20, 1994

[54] TWO-VIEW VIDEO CAMERA STAND AND SUPPORT METHOD

[75] Inventors: Craig S. K. Clapp, Boxford; Anthony M. Duys, Newburyport, both of Mass.

[73] Assignee: PictureTel Corporation, Danvers, Mass.

[21] Appl. No.: 30,845

[22] Filed: Mar. 12, 1993

[51] Int. Cl.$^5$ .............................................. G03B 17/00
[52] U.S. Cl. ..................................................... 354/293
[58] Field of Search ....................... 354/293, 81, 82; 352/243; 248/183, 185, 278, 186, 282, 284

[56] References Cited

U.S. PATENT DOCUMENTS

| | | | |
|---|---|---|---|
| 2,684,822 | 7/1954 | Odin | 354/293 X |
| 4,655,567 | 4/1987 | Morley | 352/243 |
| 4,673,268 | 6/1987 | Wheeler et al. | 354/293 X |
| 4,939,580 | 7/1990 | Ishikawa et al. | 354/293 X |
| 5,218,876 | 6/1993 | Lindsay | 354/293 X |

Primary Examiner—D. Rutledge
Attorney, Agent, or Firm—Fish & Richardson

[57] ABSTRACT

A camera stand for directing a video camera at, alternately, a room scene and a document scene, where the document in the document scene is oriented to be read by a person seated in the room scene, featuring a supporting arm and a rotatable connection connecting the video camera to, and supporting the video camera at a supporting end of, the arm. The rotatable connection allows the video camera to be alternately rotated between a position directed substantially vertically down at the document scene and a position directed substantially horizontally at the room scene. The rotatable connection has a rotation axis inclined at substantially a forty-five degree angle to the vertical, and is connected to the arm so that the video camera rotates from viewing the room scene right-side-up to viewing the document scene right-side-up.

11 Claims, 8 Drawing Sheets

TWO-VIEW VIDEO CAMERA STAND AND SUPPORT METHOD

BACKGROUND OF THE INVENTION

The invention relates generally to a camera stand apparatus and method for supporting a video camera, and more particularly to a camera stand method and apparatus useful in a videoconferencing system.

It is desireable to provide a camera stand for use in a low cost videoconferencing system that allows a single video camera to be aimed alternately at a document scene and a room scene. The room scene will typically include a person who is using the document for explanatory purposes. Prior apparatus for allowing this alternate aiming has suffered in that the document scene would be up-side-down or mirror-image reversed relative to the room scene. Accordingly, electronic scanning correction was introduced to compensate for the up-side-down or mirror-image reversals. The document scene of prior apparatus has also suffered from a poor field of view and/or "keystone distortion" (rectangular documents were distorted into trapezoids—an effect similar to that obtained when an overhead projector is aimed non-perpendicularly at a projection screen or wall).

SUMMARY OF THE INVENTION

An object of the invention is a low-cost camera stand apparatus and method that allows a video camera to be positioned, alternately, to view a room scene and a document scene without electronic correction. Thus, the video camera should view both the document scene and the room scene right-side-up.

In general, the invention relates to a camera stand for directing a video camera at, alternately, a room scene and a document scene, where the document in the document scene is oriented to be read by a person seated in the room scene. The camera stand features a supporting arm and a rotatable connection connecting the video camera to, and supporting the video camera at a supporting end of, the arm. The rotatable connection allows the video camera to be alternately rotated between a position directed substantially vertically down at the document scene and a position directed substantially horizontally at the room scene. The rotatable connection has a rotation axis inclined at substantially a forty-five degree angle to the vertical, and is connected to the arm so that the video camera rotates from viewing the room scene right-side-up to viewing the document scene right-side-up.

Particular embodiments of the invention can include the following features. The rotatable connection features a forearm member rotatably connected to the supporting end of the arm and supporting the video camera at a distance from the rotatable connection. The rotatable connection, in one embodiment, features a tilt adjustment pivotably connecting the camera for tilt movement around a substantially horizontal axis. The arm and rotatable connection are in a fixed relationship to each other, so that the rotation axis of the rotatable connection is inclined at forty-five degrees to the vertical, and oriented so that the downward extension of the axis from the rotatable connection projects toward the room scene. The rotatable connection has a pivot member that rotatably connects the camera to the arm member, retaining the camera by an elastic positive locking feature, and the pivot member is mounted to the supporting end of the arm by a second elastic positive locking feature. The rotatable connection has a stop, the video camera rotating on the rotatable connection past top dead center of the rotatable connection to rest against the stop, stably retained thereon to view the room scene and against rotating to view the document scene. The angle of the rotation axis relative to the vertical is adjustable to accommodate either a non-vertical direction of view to the document scene or a non-horizontal direction of view to the room scene. The camera stand mounts a video camera, and the video camera and stand are used as part of a videoconferencing system. The video camera has focus, zoom, and iris adjustment controls.

Among the advantages of the invention are the following. The camera stand allows a single camera both to view a room scene and a document scene, and to be easily rotated between the two scenes. The camera will view both scenes right-side-up. A videoconferencing system incorporating the camera stand can be less expensive than one with separate cameras to view the room and document scenes. Similarly, a videoconferencing system incorporating the camera stand can be less expensive than one that is required to electronically invert the image or correct for keystone distortion.

Other objects, advantages and features of the invention will become apparent from the following description of particular embodiments, and from the drawing, in which:

DESCRIPTION OF PARTICULAR EMBODIMENTS OF THE INVENTION

Figure 1:
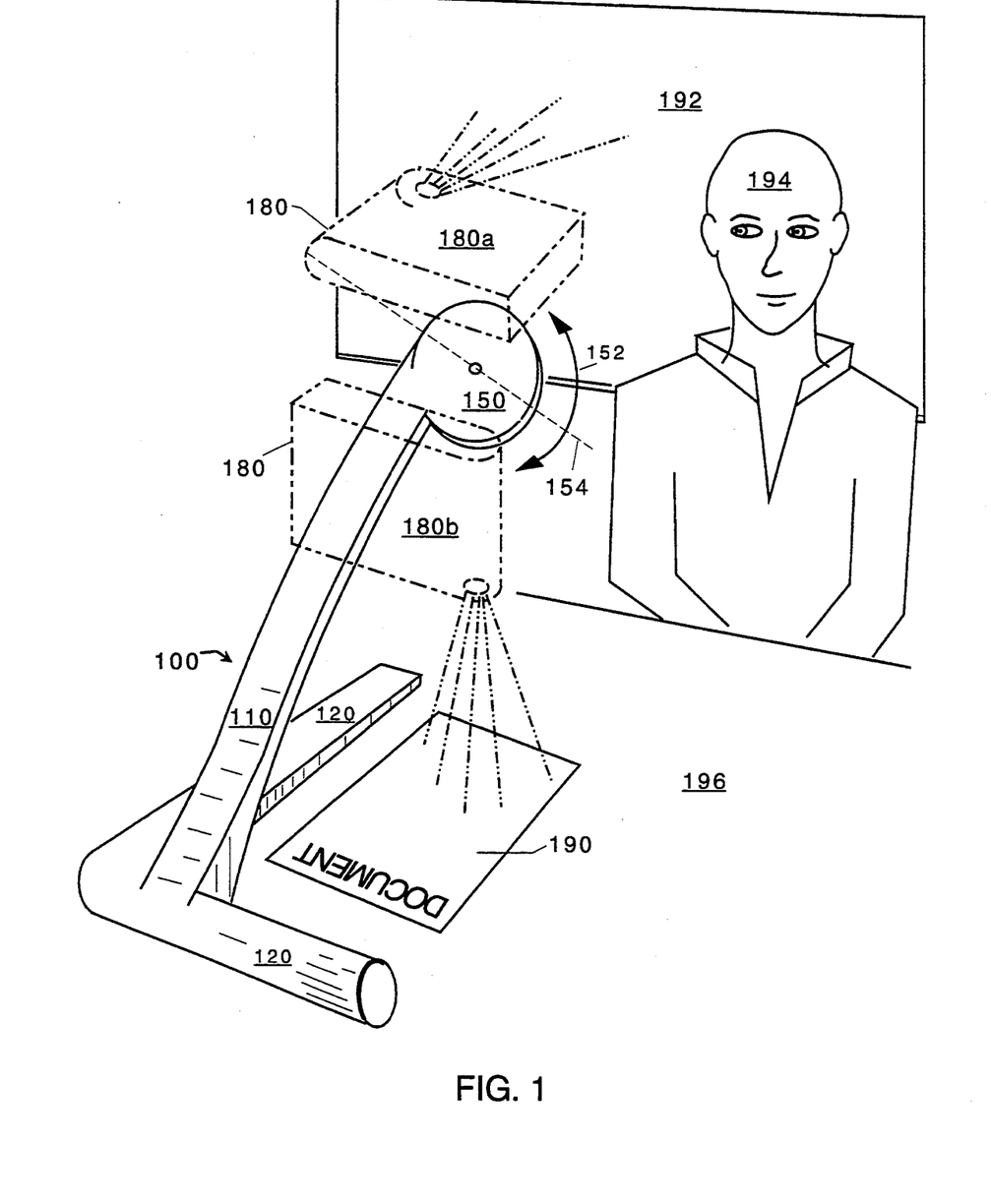
FIG. 1 is a perspective view of a first embodiment of the camera stand of the invention, showing, in phantom, the video camera directed at the document view and the room view.

Referring to FIG. 1, a camera stand 100 can direct a video camera 180 at, alternately, a document scene 190 or a room scene, e.g., a blackboard 192 and/or a person 194. The camera stand is typically supported on a table top 196 and has a base 120, which in turn rigidly supports an arm 110. At the end of the arm is a turntable joint 150 with a mounting bracket (not shown), which in turn holds video camera 180. The turntable joint allows the video camera to be alternately rotated as indicated by arrows 152 between a position 180a, in which the camera is directed at the room scene, and a position 180b, in which the camera is directed at the document scene. The axis of rotation 154 of the turntable joint is inclined at 45° from vertical, with the downward projection of the rotation axis extending generally in the direction of the room scene.

The video camera will transmit either the room scene or the document scene, both being right-side-up, when the document 190 is oriented to be read by the person 194 in the room scene. When directed at the document, the video camera is at a distance appropriate to frame the video camera's field of view over the document. The video camera is preferably centered over the document and directed perpendicularly to it, so that the document is projected without "keystone distortion."

Figure 2A:
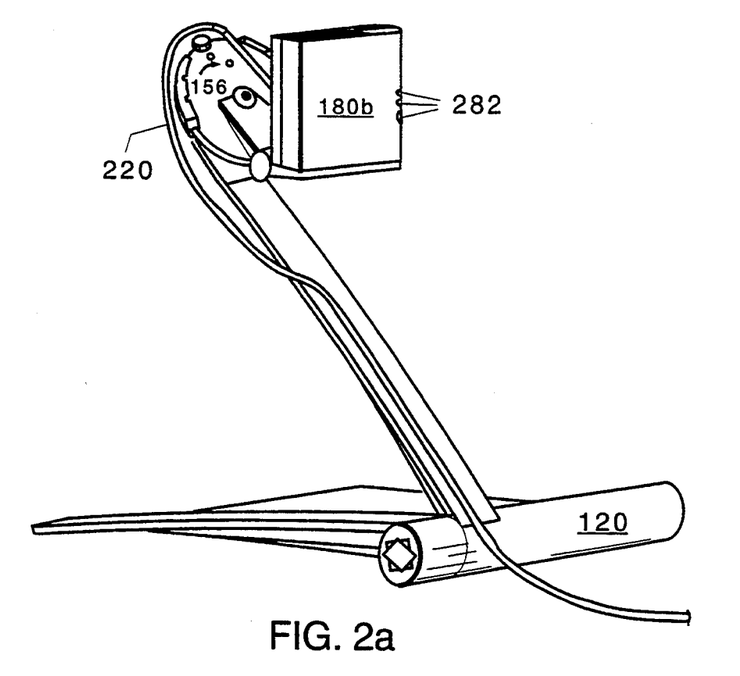
FIGS. 2a and 2b are perspective views of the first embodiment of the invention with the video camera directed at the document and room views, respectively.
Figure 2B:
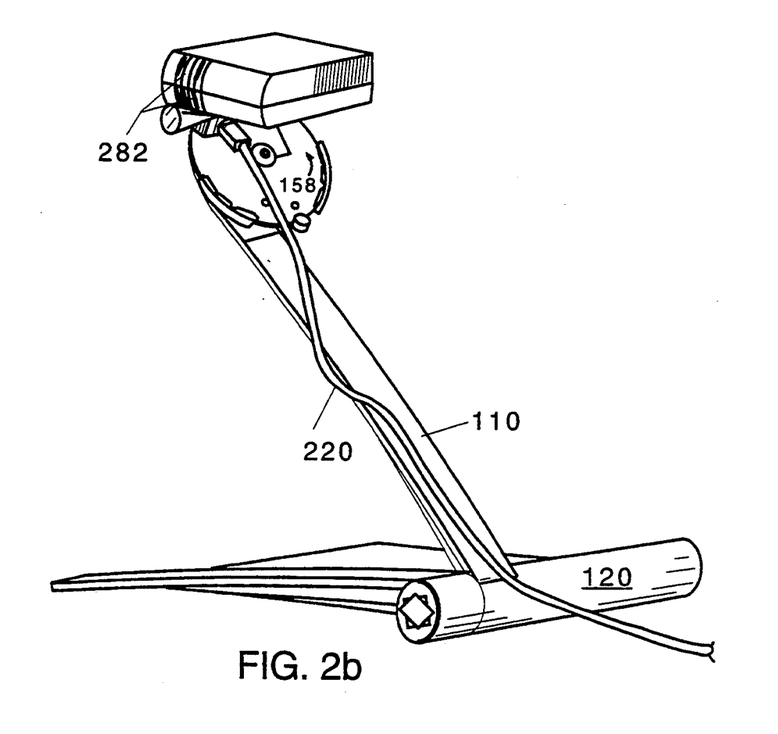

Referring to FIGS. 2a and 2b, the video camera 180 is either directed at the document scene by rotating the turntable joint in a direction 156, or directed at the room scene by rotating the turntable joint in a direction 158. The video camera is provided with slider switches 282 to control zoom, iris, and focus. These switches will typically need to be adjusted when the video camera is rotated from document to room scene or vice-versa. A video cable 220 connects the video camera to the rest of the video system.

Figure 3A:
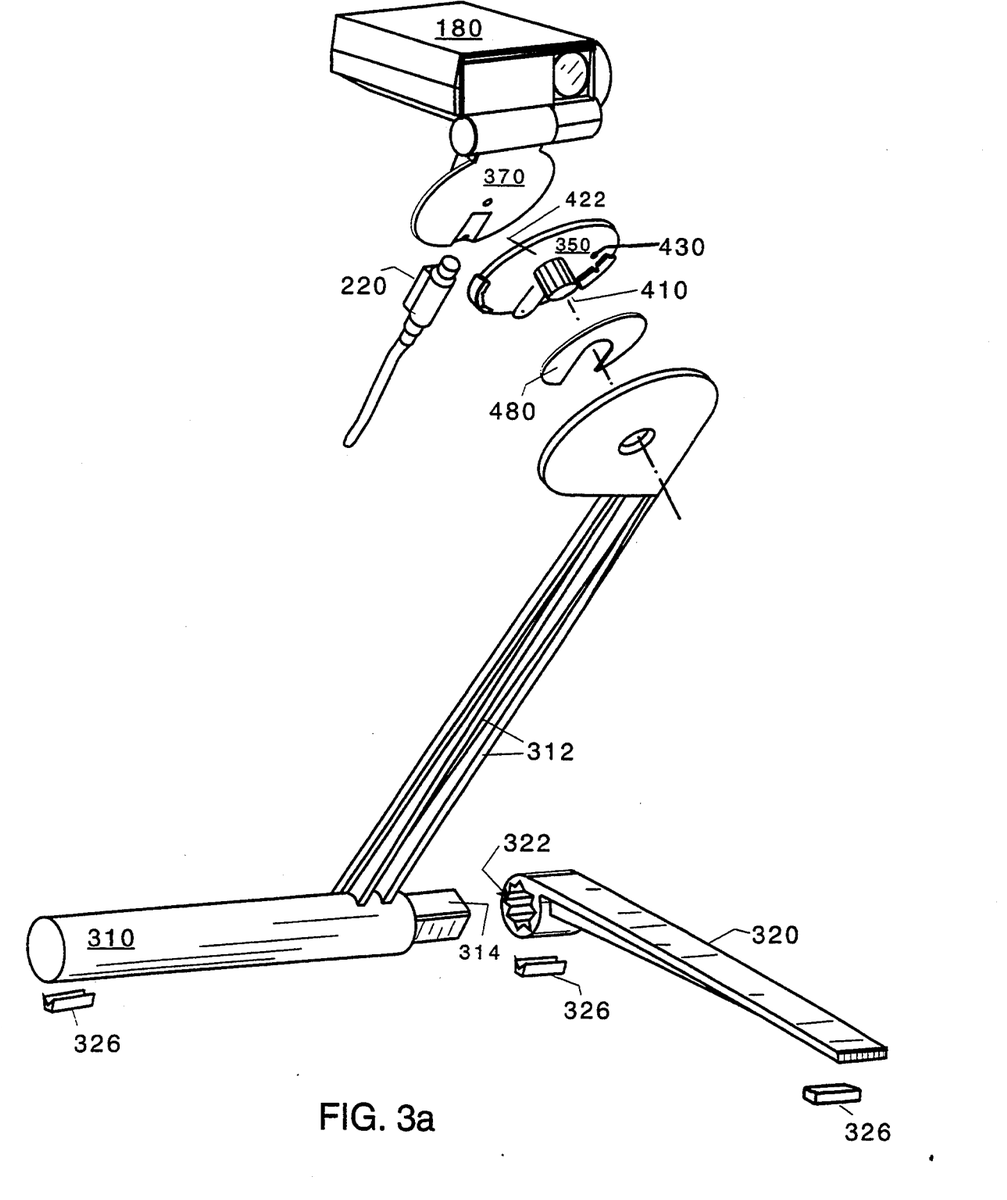
FIGS. 3a and 3b are exploded views of the camera stand of the first embodiment of the invention.
Figure 3B:
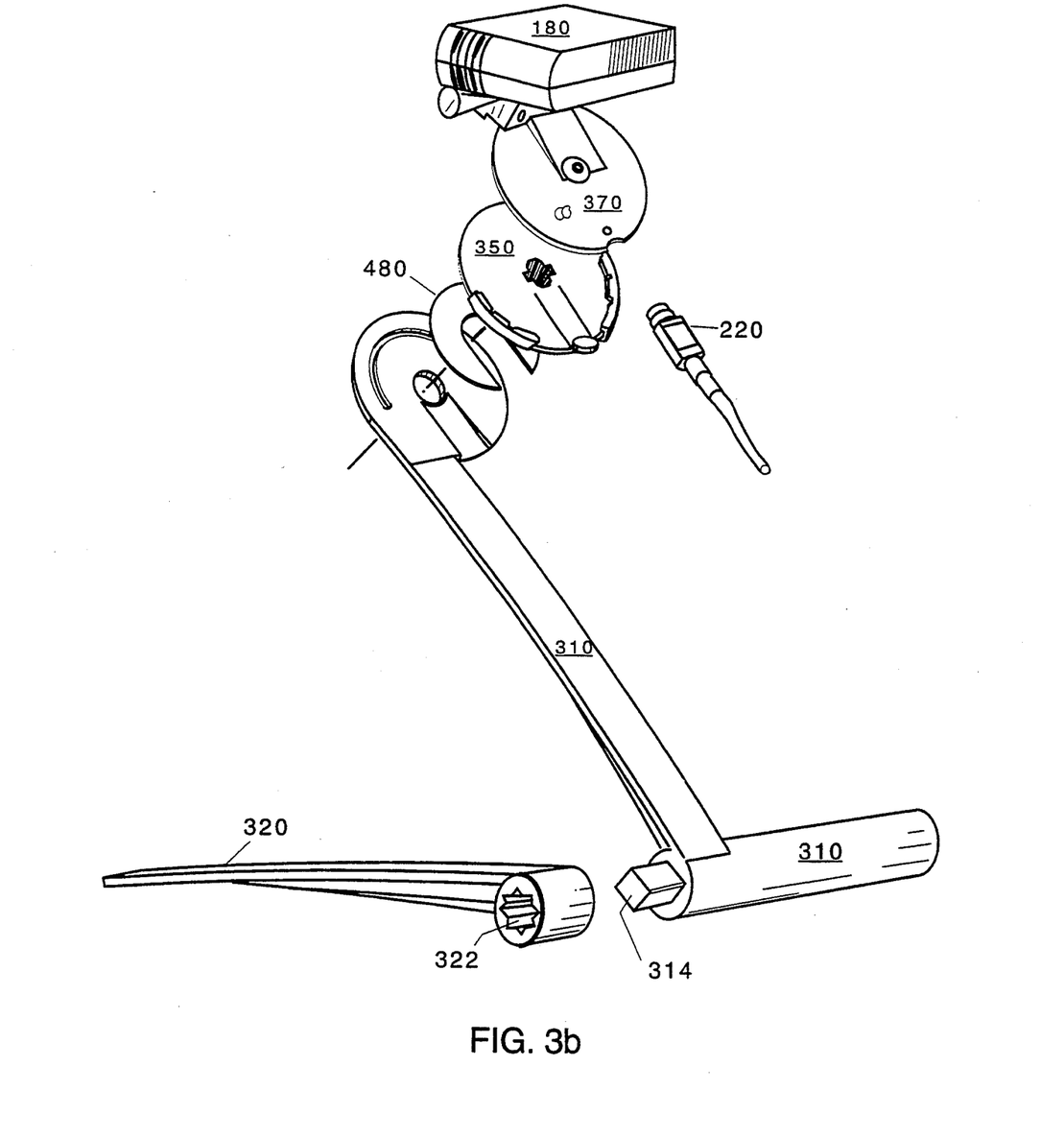

Referring to FIGS. 3a and 3b, the major components of the camera stand are a turntable disk 370 mounting the camera, a pivot disk 350, an arm part 310 and a leg part 320. The arm 310 and leg 320 are formed from a convenient structural material, e.g., cast aluminum alloy or a glass-filled modified PPO resin, for instance Noryl® from General Electric, preferably 30% glass-filled. These materials provide good strength, stiffness and dampen any oscillations caused by manual movement of the camera. The arm proper 110 is fabricated with ribs 312 to reduce the weight of the stand. The arm and leg parts are held together by a friction fit between a square end feature 314 of the arm and splined opening 322 in the leg, forming an L-shaped base that frames the document scene and supports the support arm with its turntable end centered over the document scene. The arm and leg may alternately be joined by a lockable rotatable shaft joint. The arm and leg can be disassembled at the spline or folded at the rotatable joint to lie flat for storage. Rubber feet 326 protect the table top.

Figure 4:
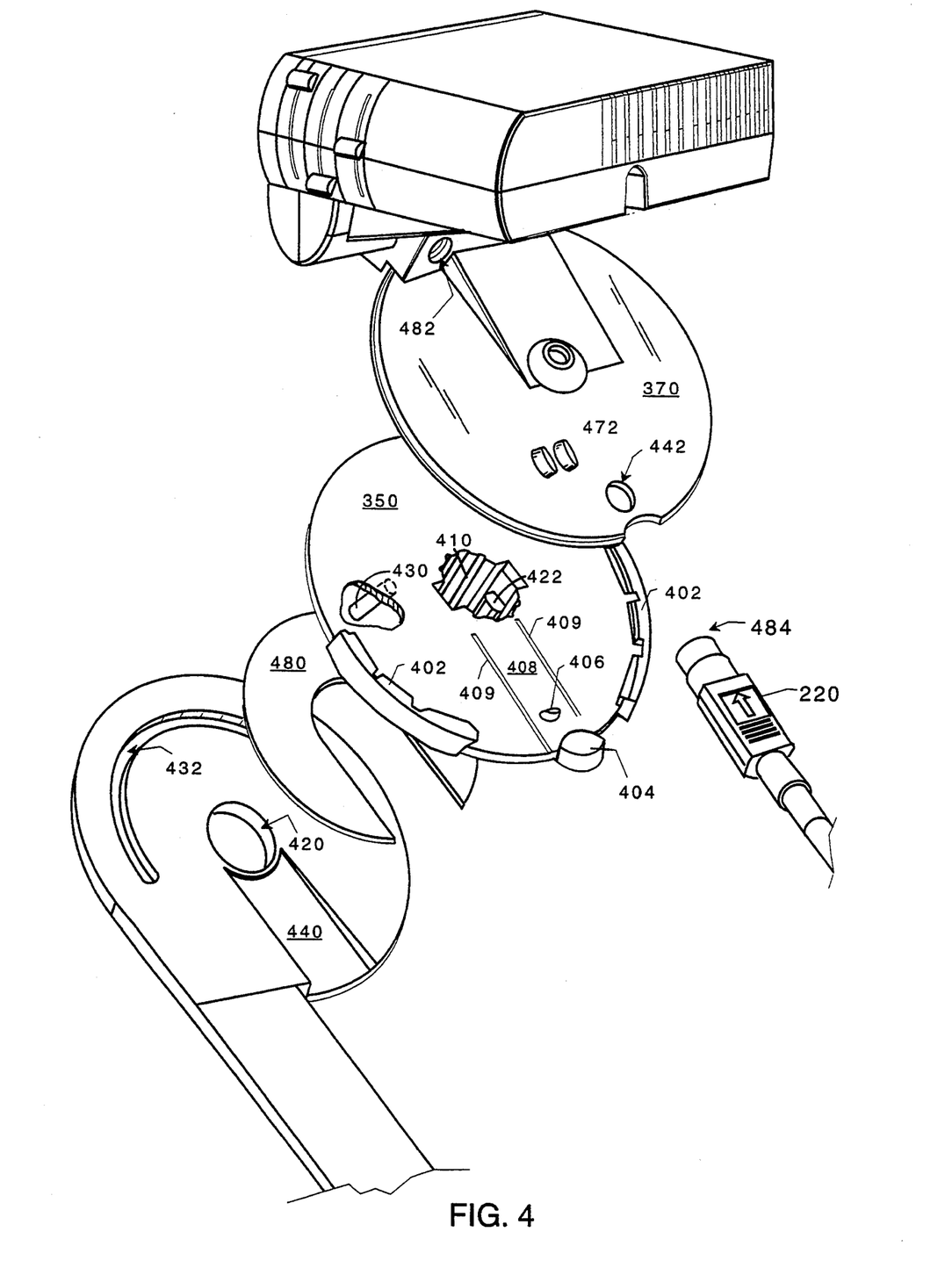
FIG. 4 is a detail of the exploded view of FIG. 3b, partially cut away.

Referring to FIG. 4, the camera is mounted to the turntable disk 370 by a tilt hinge 500 (which will be discussed in more detail in connection with FIG. 5). The turntable disk 370 is retained in the pivot disk 350 by raised features of the pivot disk, discussed below. The turntable disk does not rotate within the pivot disk. The turntable disk has a clip 472 to hold the video cable 220. The video cable plugs into the camera in a bayonet joint 482, 484.

The pivot disk 350 is preferably formed of PC/ABS plastic. The pivot disk has a rim 402 that wraps over the edge of the turntable disk. Elliptical button 404 and rounded feature 406 are mounted on a tongue 408 formed by two parallel slots 409 in the pivot disk. Rim 402, button 404 and rounded feature 406 cooperate to retain the turntable disk. The pivot disk 350 has an axle protrusion 410 (seen also in FIG. 3a) that mates with a hole 420 in the support arm; the pivot disk, turntable disk, and camera rotate on this axle. The axle has locking tabs 422 that lock the pivot disk into the arm hole 420. These tabs may be pinched together to release the pivot disk from the arm hole. The face of the support arm has a depression 440 so that tongue 408 of the pivot disk can be depressed when the camera is facing in the room direction. When the elliptical button 404 is depressed into depression 440, the rounded feature 406 withdraws from hole 442 in the turntable disk, releasing the turntable disk from the pivot disk so that the camera may be removed from the camera stand.

The rotation of the video camera on the turntable joint can be limited by a pin 430, visible through the cutaway portion of the turntable disk and also visible in FIG. 3a, riding in a channel 432.

The stability of the camera in the room-directed position may be ensured by any of several techniques. For instance, the turntable joint may be arranged so that the camera is metastably held at the top point of the rotational arc of the joint by friction. Or, small depressions and a spring may form detentes to offer positive retention. Or, the axis of the rotatable connection may be tipped slightly to the side and the arc through which the camera rotates arranged so that the camera rotates a few degrees past top dead center to fall against a stop, so that the camera is held stable in the room-view direction; similarly, at the bottom of the rotation arc, the camera may fall against a stop a few degrees before bottom dead center so that the camera will be stable in the document-view direction.

It may be desireable to face the disk of the support end of the arm with a thrust washer 480, either of felt to provide the proper friction to retain the camera in the upright position, or 0.010″-thick teflon to lubricate the turntable joint.

Figure 5:
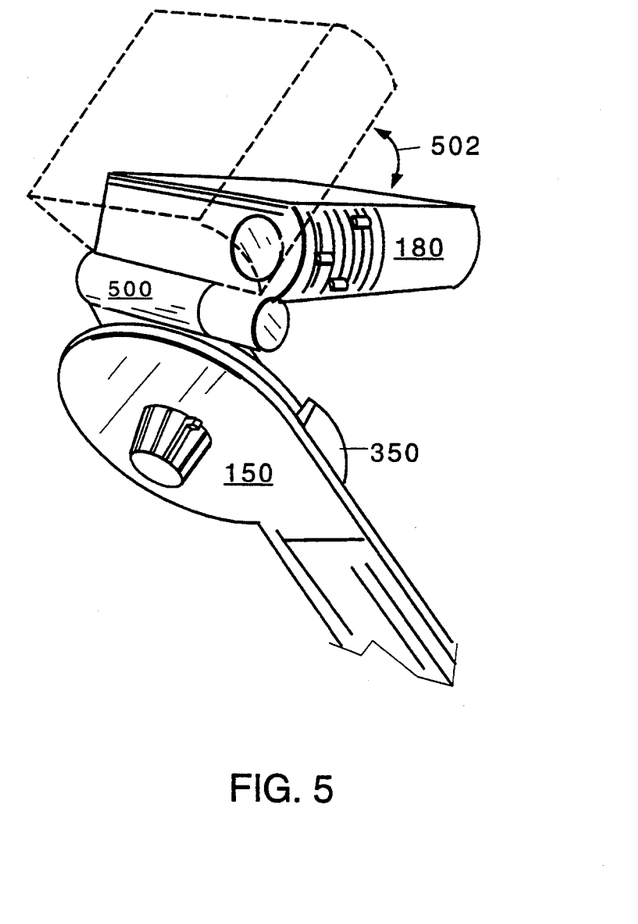
FIG. 5 is a perspective view of the video camera and mounting bracket of the first embodiment of the invention.

Referring to FIG. 5, to allow the video camera to be directed at different room scenes, for instance to accommodate people of different heights, the video camera can be connected to the turntable disk 370 by the tilt hinge 500 that allows the video camera to be tilt-adjusted as indicated by arrows 502. In the illustrated embodiment, the tilt hinge allows for 100° of tilt for optimum eye contact; the camera can be redirected up to 10° above horizontal or up to 90° below. The tilt hinge is a friction hinge of a design familiar from the screen/keyboard joint of lap-top personal computers. A preferred hinge is the Torque Master ™ hinge from General Clutch, in which two bands are counter-helically wound around a central shaft to offer friction against the outer casing of the hinge, and spring tension opposes the weight of the camera.

Figure 6A:
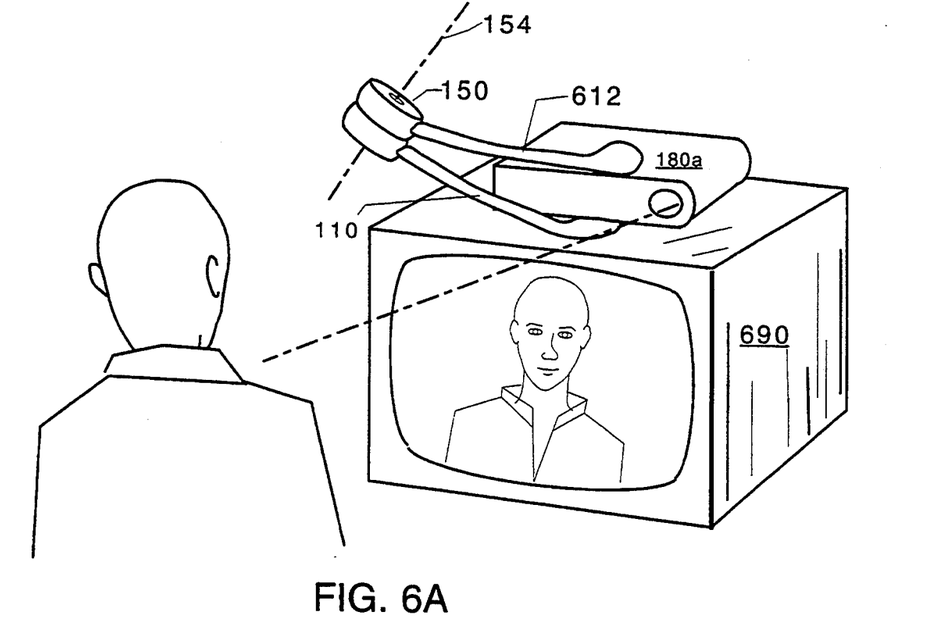
FIGS. 6a and 6b are perspective views of a second embodiment of the camera stand of the invention.
Figure 6B:
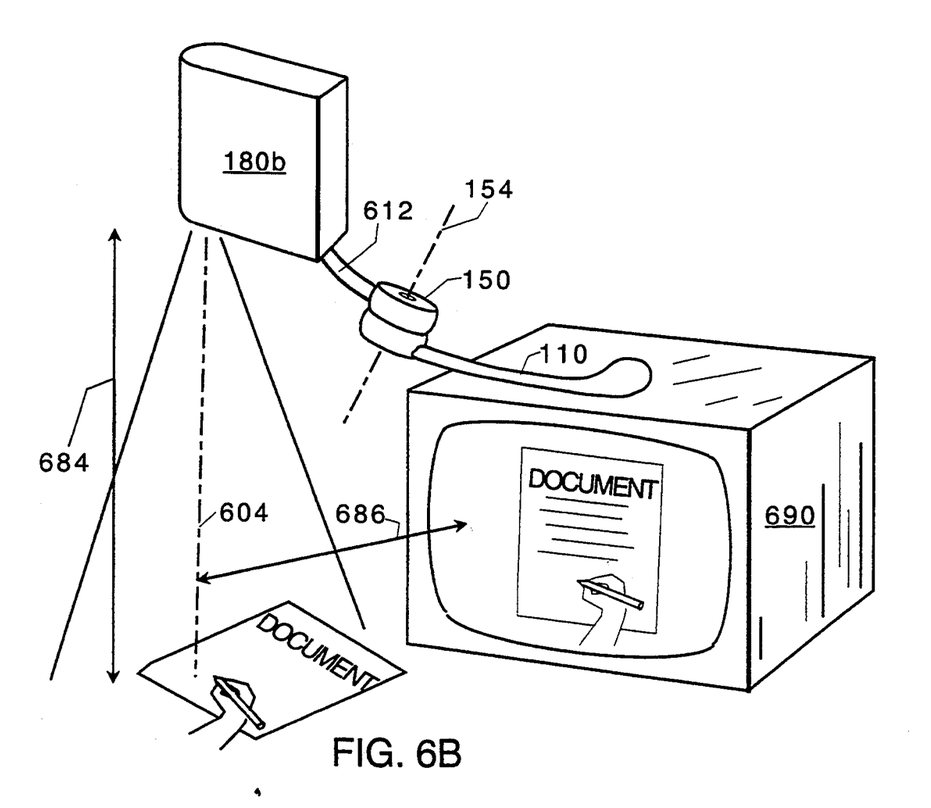

FIGS. 6a and 6b show a second embodiment of the invention, in which a camera stand can be mounted atop a video monitor 690. The stand has arm 110 affixed to the top of the monitor, extending to turntable joint 150. As in the first illustrated embodiment of the invention, turntable joint 150 has a rotation axis 154 inclined at an angle of 45° to the vertical. From the turntable joint, a forearm member 612 extends to support and mount the video camera 180. In FIG. 6a, the video camera is in a position 180a directed at the room scene. In FIG. 6b, the forearm and video camera have been rotated approximately 180° to position 180b, for directing the video camera at the document scene. In the document scene conformation, the video camera lens is held out at a distance 686 from the front of the monitor, so that the center axis 604 of the field of view is centered on the document scene, thereby reducing keystone distortion. The video camera is also at a distance 684 above the table surface to ensure a field of view adequate to encompass the entire document. In this illustrated embodiment, the forearm member is of a length roughly equal to the length of the arm 110.

The geometry of the camera stand may be tailored to aiming requirements for the video camera. For instance, referring to the configuration of FIG. 7, a base 720 may provide a tilted easel surface 790 for the document, and the room scene, along a view axis 702 for the video camera, may be somewhat below horizontal. Similarly, the viewing direction from the camera to the document is preferably along a line 704 that is perpendicular at 716 to the document scene and is centered over it, and therefore not perfectly vertical. This geometry can be achieved by arranging the rotation axis 720 of the turntable joint to bisect angle 712, the angle between the document direction 704 and the room view direction 702.

Figure 7:
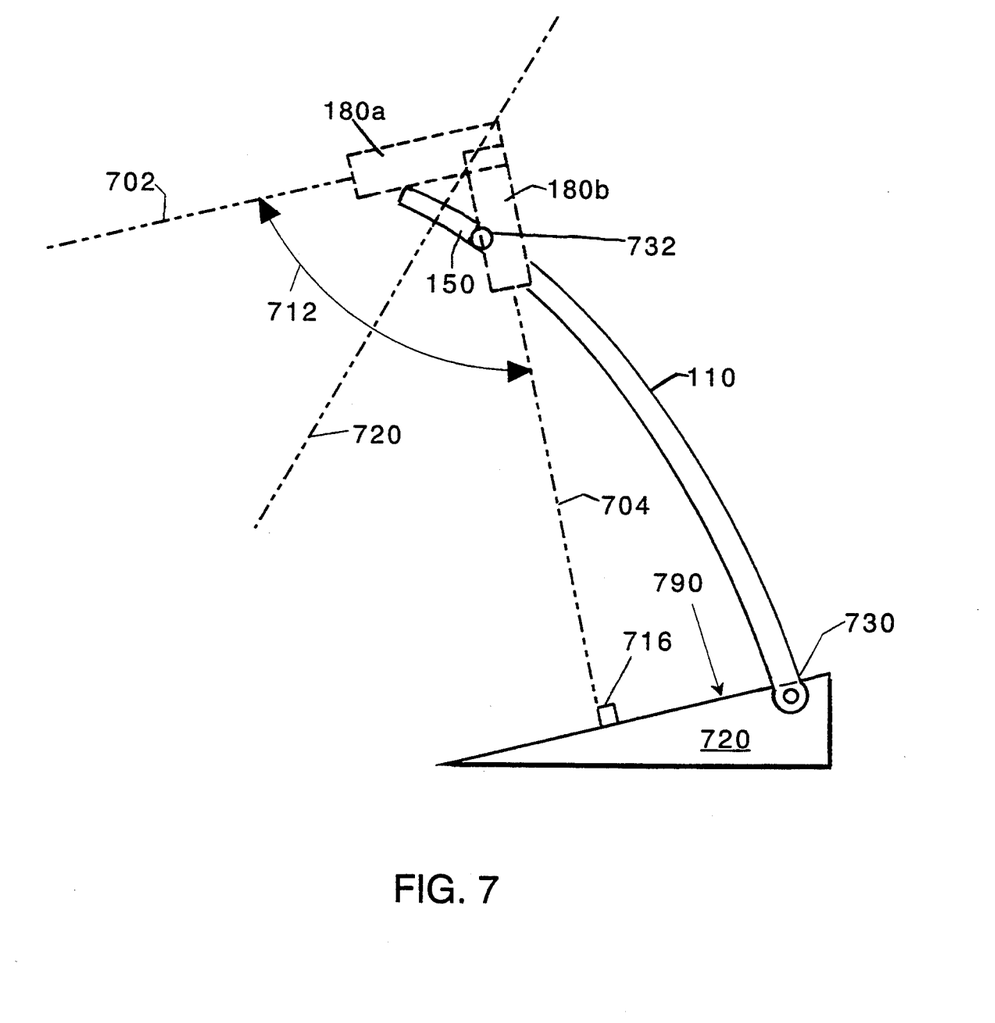
FIG. 7 is a side view of a third embodiment of the invention.

If the case where either the "horizontal" direction 702 or the "vertical" direction 704 will vary from conference to conference, but will remain fixed during any individual conference, the arm can have pivoting joints 730, 732 at either the base end or the end adjacent the turntable joint, or both, so that the angle of the axis of the turntable joint relative to the vertical can be adjusted. In this illustrated embodiment of the invention, the pivoting joint can be adjusted so that the video camera rotates directly between the room direction and the document direction, without further adjustment, for instance the tilt adjustment of FIG. 2c.

Other embodiments are within the following claims.
What is claimed is:

1. A camera stand for directing a video camera at alternately, a room scene and a document scene, a viewing axis of the video camera when directed at the room scene being substantially horizontal and a viewing axis of the video camera when directed at the document scene being substantially vertical, a document in said document scene lying in a substantially horizontal plane and oriented to be read substantially right-side-up by a person facing from a point in the room scene generally toward the video camera, the camera stand comprising:
    a supporting arm; and
    a rotatable connection connecting the video camera to, and supporting the video camera at, a supporting end of said arm and for allowing the video camera to be alternately rotated between a position directed substantially vertically down at the document scene and a position directed substantially horizontally at the room scene,
    said rotatable connection having a rotation axis inclined at substantially a forty-five degree angle to the vertical, and connected to said arm so that the video camera rotates upon said rotatable connection from viewing the room scene right-side-up to viewing the document in the document scene right-side-up.

2. The camera stand of claim 1 wherein said rotatable connection further comprises a forearm member rotatably connected to said supporting end and supporting the video camera at a distance from said rotatable connection.

3. The camera stand of claim 1 wherein said rotatable connection further comprises a tilt adjustment pivotably connecting the video camera for tilt movement around a substantially horizontal axis.

4. The camera stand of claim 1 wherein said arm and rotatable connection are in a fixed relationship to each other, so that the rotation axis of said rotatable connection is inclined at forty-five degrees to the vertical, a downward extension of said axis from said rotatable connection projecting toward said room scene and at an angle of forty-five degrees to the room scene camera viewing axis.

5. The camera stand of 1 wherein the angle of said rotation axis relative to the vertical is adjustable to accommodate either a non-vertical direction of view to said document scene or a non-horizontal direction of view to said room scene.

6. The camera stand of claim 1 further comprising a video camera having focus, zoom, and iris adjustment controls.

7. A camera stand for directing a video camera at alternately, a room scene and a document scene, a viewing axis of the video camera when directed at the room scene being substantially horizontal and a viewing axis of the video camera when directed at the document scene being substantially vertical, a document in said document scene lying in a substantially horizontal plane and oriented to be read substantially right-side-up by a person facing from a point in the room scene generally toward the video camera, the camera stand comprising:
    a supporting arm; and
    a rotatable connection connecting the video camera to and supporting the video camera at a supporting end of said arm and for allowing the video camera to be alternately rotated between a position directed substantially vertically down at the document scene and a position directed substantially horizontally at the room scene,
    said rotatable connection having a rotation axis inclined at substantially a forty-five degree angle to the vertical, and connected to said arm so that the video camera rotates upon said rotatable connection from viewing the room scene right-side-up to viewing the document in the document scene right-side-up;
    said rotatable connection further comprising a tilt adjustment pivotably connecting the video camera for tilt movement around a substantially horizontal axis.

8. The camera stand of claim 7 wherein said rotatable connection further comprises a pivot member that rotatably connects the video camera to said arm member, retaining the video camera by an elastic positive locking feature, and
    a second elastic positive locking feature for mounting said pivot member to said supporting end of said support arm.

9. A method for conducting a video conference comprising the steps of:
    providing a video camera mounted on a camera stand, the video camera directed substantially horizontally at a room scene; and
    rotating the video camera about a rotatable connection of said camera stand to a position directed substantially vertically down at a document scene, a document in said document scene lying in a substantially horizontal plane and being oriented to be read substantially right-side-up by a person facing from a point in the room scene generally toward the video camera., said rotatable connection having single a rotation axis so that when the video camera rotates upon said rotatable connection from viewing the room scene right-side-up, the video camera can view the document in the document scene right-side-up.

10. The method of claim 9 wherein said rotation axis is inclined at forty-five degrees to the vertical.

11. The camera stand of claim 1 wherein said rotatable connection comprises a bracket, rigid during said alternating rotation, that supports the video camera with its view axis at substantially forty-five degrees from said rotation axis.

* * * * *